(12) United States Patent
Lee et al.

(10) Patent No.: US 6,310,839 B1
(45) Date of Patent: Oct. 30, 2001

(54) MULTIMEDIA SEARCH AND INDEXING FOR AUTOMATIC SELECTION OF SCENES IN A MEDIA BY ANALYZING FREQUENCY RANGES

(75) Inventors: Peter S. Lee, Calabasas Park, CA (US); Edith H. Stern, Boca Raton, FL (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/693,828

(22) Filed: Oct. 23, 2000

Related U.S. Application Data

(62) Division of application No. 09/107,389, filed on Jun. 30, 1998, now Pat. No. 6,163,510.

(51) Int. Cl.[7] .................................................. G11B 17/22
(52) U.S. Cl. .................................................. 369/32; 386/55
(58) Field of Search .................................. 369/32, 33, 27, 369/28, 83; 386/55, 54, 52, 4, 5, 69, 70, 71, 81, 82; 300/13, 5

(56) References Cited

U.S. PATENT DOCUMENTS

| | | | |
|---|---|---|---|
| 4,716,557 | 12/1987 | Otani | 369/32 |
| 4,760,526 | 7/1988 | Takeda et al. | 369/32 |
| 5,289,450 | 2/1994 | Mizumoto et al. | 369/32 |
| 5,469,270 | 11/1995 | Yamamoto | 386/55 |
| 5,561,649 | 10/1996 | Lee et al. | 3869/32 |
| 5,579,124 | * 11/1996 | Aijala et al. | 386/96 |
| 5,613,032 | 3/1997 | Cruz et al. | 386/69 |
| 5,621,658 | 4/1997 | Jackson et al. | 364/514 R |
| 5,683,253 | 11/1997 | Park et al. | 369/32 |
| 5,713,021 | 1/1998 | Kondo et al. | 395/614 |
| 5,732,184 | 3/1998 | Chao et al. | 386/55 |
| 5,771,330 | 6/1998 | Takano et al. | 386/52 |
| 5,911,030 | 6/1999 | Kikuchi et al. | 386/55 |
| 5,930,446 | 7/1999 | Kanda | 386/52 |
| 6,044,197 | 3/2000 | Smith et al. | 386/55 |
| 6,185,527 | * 2/2001 | Petkovic et al. | 704/231 |

* cited by examiner

*Primary Examiner*—Tan Dinh
(74) *Attorney, Agent, or Firm*—Joseph C. Redmond, Jr.; Richard A. Tomlin; Morgan & Finnegan, LLP

(57) ABSTRACT

A multi-media search and indexing system for automatic selection of scenes or sounds recorded in media for replay in other context by analyzing the media for a set of frequency ranges of interest for replay. The media is analyzed to select desired frequency ranges of interest within the media, the selected frequency ranges being indicative of a scene or sound of interest. The granularity or length of the selected frequency ranges is selected for analysis. A number of analysis intervals are determined in the selected frequency ranges. The media is filtered for the selected frequency ranges and the audio level is measured for each interval. An audio clip level is established for each frequency range as indicative of a scene or sound of interest. The interval frequency range and audio level are recorded for subsequent replay.

18 Claims, 7 Drawing Sheets

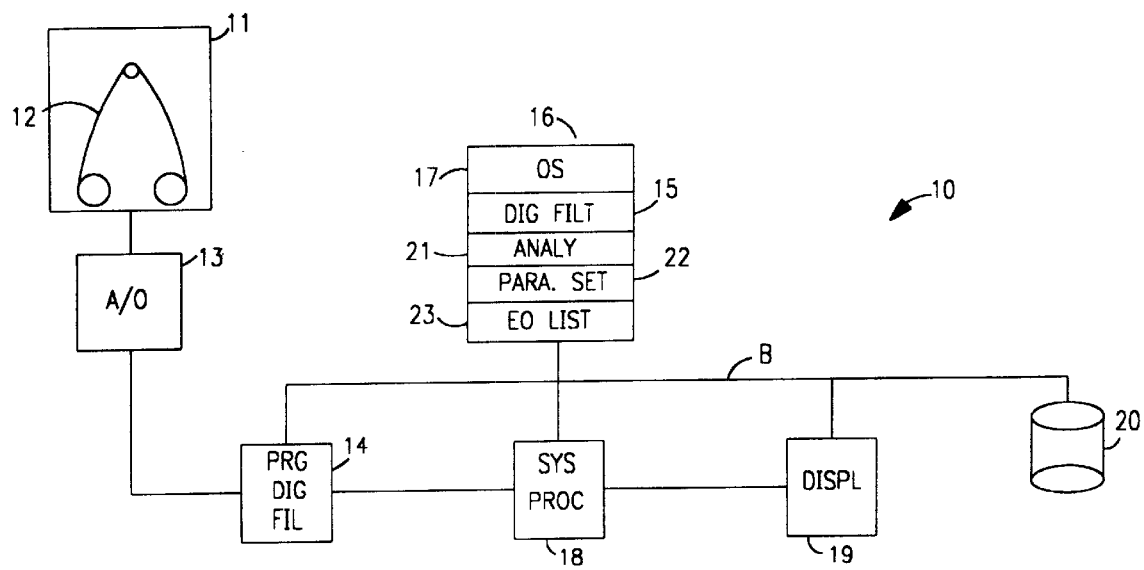
FIG. IA
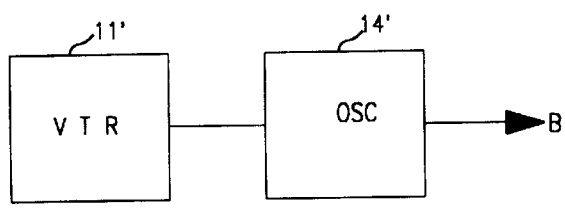
FIG. IB

| HIGHLIGHT NUMBER | START TIME | END TIME |
|---|---|---|
| 1 | START TIME 1 | END TIME 1 |
| 2 | START TIME 2 | END TIME 2 |
| ⋮ | ⋮ | ⋮ |
| N | START TIME N | END TIME N |

FIG. 7

MULTIMEDIA SEARCH AND INDEXING FOR AUTOMATIC SELECTION OF SCENES IN A MEDIA BY ANALYZING FREQUENCY RANGES

CROSS-REFERENCE TO RELATED APPLICATION

This is a divisional application under 37 C.F.R. 1.53(b) of U.S. patent application Ser. No. 09/107,389, filed on Jun. 30, 1998 now is U.S. Pat. No. 6,163,510.

BACKGROUND OF THE INVENTION

1. Field of Invention

This invention relates to information systems. More particularly, the invention relates to multimedia search and indexing systems for automatic event selection for replay using audio cues and signal threshold levels.

2. Description of Prior Art

In managing intellectual property assets for maximum return, it is common in the media industry to re-purpose assets, particularly video and sound recording assets, in whole or in part, into other products. An example of a re-purposed asset would be, for example, a video recording of a sporting event shown on television; a portion later included in a commercial; and multiple clips used for news or highlight recaps of the event as well as in a CD-ROM game. Given the need to maximize asset return, the content owner is faced with the problem of finding the desired sections of video or audio materials within a given asset or assets. This is the case whether the asset is stored in a computer system or on traditional analog media such as magnetic tape or film. The state of the art for identifying events for re-purposing is automatic scene change detection. This technology identifies the first frame of a scene that is dramatically different than the preceding scene. However, changes of scene may not be well correlated with the section of media that is desired for re-purposing. For example, in a fast moving game like hockey, the events, such as a goal scored or goal missed, or a key player returning to the ice, may not constitute a change of scene.

What is needed is a mechanism for automating the selection of scenes of interest in an event in one context for re-purposing in another context in which the selected events correlate with the scenes and sounds and context of another media product.

Prior art related to re-purposing intellectual property includes the following:

U.S. Pat. No. 5,713,021 issued Jan. 18, 1998 and filed Sep. 14, 1995, discloses a multimedia system which facilitates searching for a portion of sequential data. The system displays neighboring data depending on a requirement when displaying the portion of the data. A view object management means searches view objects stored in a view object storage means depending on a specification of features of a portion of that data. A display/reproduction means displays and reproduces a portion of data corresponding to the view searched by the view object means.

U.S. Pat. No. 5,613,032 issued Mar. 18, 1997, and filed Sep. 2, 1994, discloses a system for recording and playing back multimedia events and includes recording sources, a preprocessor, a delivery processor, and user control units. The system records and plays back multimedia events which entails capturing tracks of various aspects of a multimedia event; coding the tracks into digitized blocks; time stamping each block; and compressing and preprocessing each track as instructed in a source mapping table; transmitting tracks of the multimedia event to the user as requested; and adjusting the delivery track based upon relative time information associated with the new position established after search through a track of the multimedia event.

U.S. Pat. No. 5,621,658 issued Apr. 15, 1997, and filed Jul. 13, 1993, discloses communicating an electronic action from a data processing system via an audio device. At the sending data processing system, an action is converted to a pre-determined audio pattern. The action may be combined with text converted into an audio message and contained in an electronic mail object. The audio patterns are then communicated to the audio device over telephone lines or other communication means. At the receiving end, the audio device records the object. A user can provide the recorded object to a data processing system which then executes the action and converts the text audio patterns back to text. In addition, the action can be converted to text and displayed on the data processing system.

None of the prior art discloses re-purposing intellectual property, e.g., video and sound, in which certain events or sound in one context are automatically selected for use in or with another context, where the selected events correlate with the scenes and sounds in or with the other context.

SUMMARY OF THE INVENTION

An object of the invention is a system and method for selecting scenes of interests in an event in one context for incorporation in, or with another context, as a new or modified product.

Another object is a system and method for automatically selecting and correlating scenes of interest in one context, for incorporation in or with another context, as a new or modified product using audio cues for such selection and correlation.

Another object is a system and method for automatically selecting and correlating scenes of interest in one context using audio cues and signal level thresholds for incorporation of the selected scenes in other contexts as a new or modified product.

Another object is a system and method for logically combining different audio cues in selecting scenes of interest in one context for use in different contexts.

Another object is a system and method for creating an Edit Decision List identifying scenes of interest selected in one context for use in another context using audio cues and signal thresholds.

Another object is a system and method for establishing "start" and "stop" times in an Edit Decision List for selection of scenes of interest in one context to be used in different contexts.

These and other objects, features and advantages, are achieved in a multimedia search and indexing system which automatically selects events or scenes of interest from any media—video, films, sound—for replay in whole, or in part, in other contexts, as a new or modified product. The entire audio track of a recorded event in video, film, sound, etc., is analyzed to determine audio levels or cues within a set of frequency ranges of interest. The frequency ranges indicate different sounds, e.g. a referee whistle; loud shouting or clapping; a bell sound, etc., each sound having a distinctive frequency and indicative of a scene of interest which correlates with a highlight in an event when occurring at a defined audio clip level. Alternatively, the sound level may drop dramatically as indicative of a scene of interest. Multiple frequency ranges may be analyzed for audio cues in refining the identification of a scene of interest. An Edit Decision List (EDL) of scenes of interest is generated from the analysis of the audio track in which the frequency ranges and audio levels match the criteria for a scene of interest. The list includes "start" and "stop" times related to the time codes in the track of the media for locating the scenes of interest as a visual clip. The visual clips are reviewed and accepted or rejected for re-purposing. Once selected, the visual clips are edited using industry standard audio and video editing techniques.

DESCRIPTION OF DRAWING

The foregoing objects, features and advantages will be further understood from a detailed description of a preferred embodiment taken in conjunction with the appended drawing, in which:

FIG. 1A is a block diagram of an illustrative system for multimedia searching and indexing using audio cues and signal level thresholds and incorporating principles of the present invention.

FIG. 1B is an alternative system for multimedia searching and indexing using audio cues and signal level thresholds.

FIG. 7 is a reproduction of an Edit Decision List (EDL).

DESCRIPTION OF PREFERRED EMBODIMENT

Figure 2:
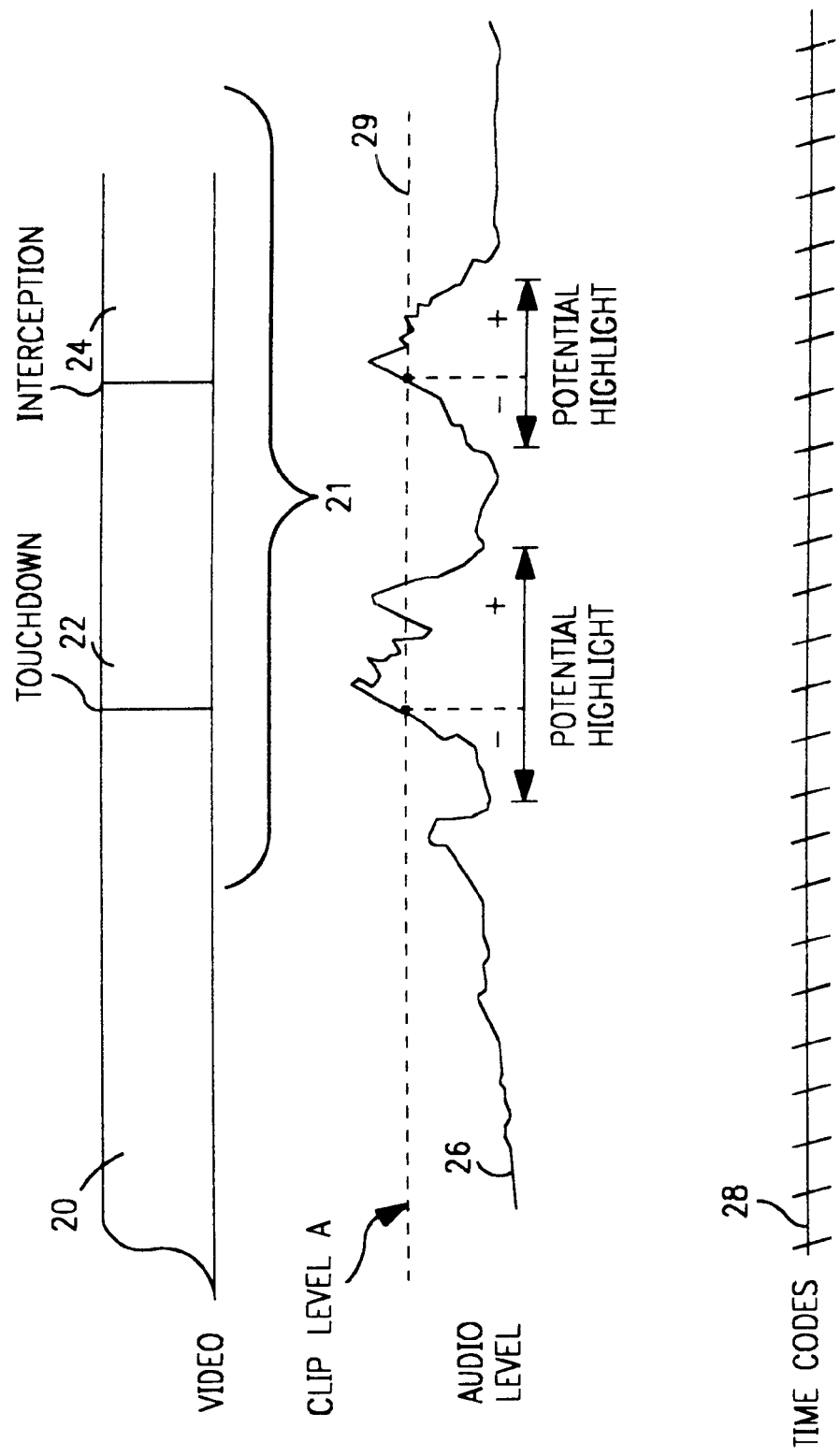
FIG. 2 is a representation of a visual tape and accompanying sound track indicating events of interest for re-purposing in another context as a new or modified product.

In FIG. 1A, a system 10 is shown for automatically identifying and selecting scenes or sounds of interest in a media using audio cues and signal level thresholds for re-purposing the media. The system includes a means of listening to or viewing source material on a tape transporter 11, such as a conventional tape drive or other equipment in which a visual or sound media 12, e.g film, video disk, compact disk is loaded and moved back and forth according to an editor's needs in selecting scenes or sounds of interest for re-purposing. An analog signal on the tape is transferred to an analog/digital converter 13 for conversion into a digital counterpart by well-known methods, e.g., pulse amplitude modulation. A digital signal on the tape or the converted analog signal is provided to a programmable digital filter 14. The programmable digital filter 14 is responsive to the digital signal in conjunction with a digital filter program 15 stored in a random access memory 16. The digital filter program 15 in conjunction with the filter 14 selects frequency ranges in the analog signal of interest to an editor. The memory 16 is coupled through a system bus B to a system processor 18, a display 19, a storage disk 20. The memory also includes a standard operating system, an analysis program 21 for identifying scenes of interest in the media 12; a parameter setting program 22 for automatically setting audio levels or cues representative of scenes of interest in the media 12; and an edit decision list program 23 which provides "start" and "stop" time codes in the media for scenes of interest as a basis for an editor to select the scene, display it on the monitor 19, and incorporate the scene into a modified or new product using conventional editing processes. The analysis program 21; parameter setting program 22; and edit decision list program 23 will be described hereinafter in implementing the method of the invention in the system 10.

In FIG. 1B an alternative system for multimedia searching and indexing using the analysis program 21; parameter setting program 22 and edit decision list program 23 includes a standard video tape recorder 11' and a standard oscilloscope 14' as substitutes for the transporter 11, A/D converter 13 and programmable filter 14 in providing the audio signal from the media 12 to the system bus B for processing in the manner to be described hereinafter for both FIGS. 1A and 1B.

As an illustrative example of re-purposing, FIG. 2 shows an event of interest, for example a football game, as recorded on a videotape 20 and containing a video clip 21 having scenes of interest for re-purposing in another context. In one embodiment, the clip 21 contains scenes of a touchdown 22 and an interception 24. The tape 20 includes a soundtrack 26 which records the sound levels accompanying the scenes. The taped scenes and soundtrack are accompanied by time codes 28 included in the tape. The time codes are industry standard time codes used to navigate the tape. The sound signal levels are selected for a clip level or threshold 29 based on past experience. Signal levels exceeding the threshold are used to identify a scene for re-purposing as will be described in conjunction with FIGS. 3–6.

In another embodiment, sound levels equal to or less than a threshold may be indicative of a scene or sound of interest. For example when a factory shuts down and the power equipment stops running, a dramatic drop in sound would occur indicative of a scene or sound of interest. However, for purposes of description of the invention, the cases of sounds exceeding a threshold will be described.

Figure 3:
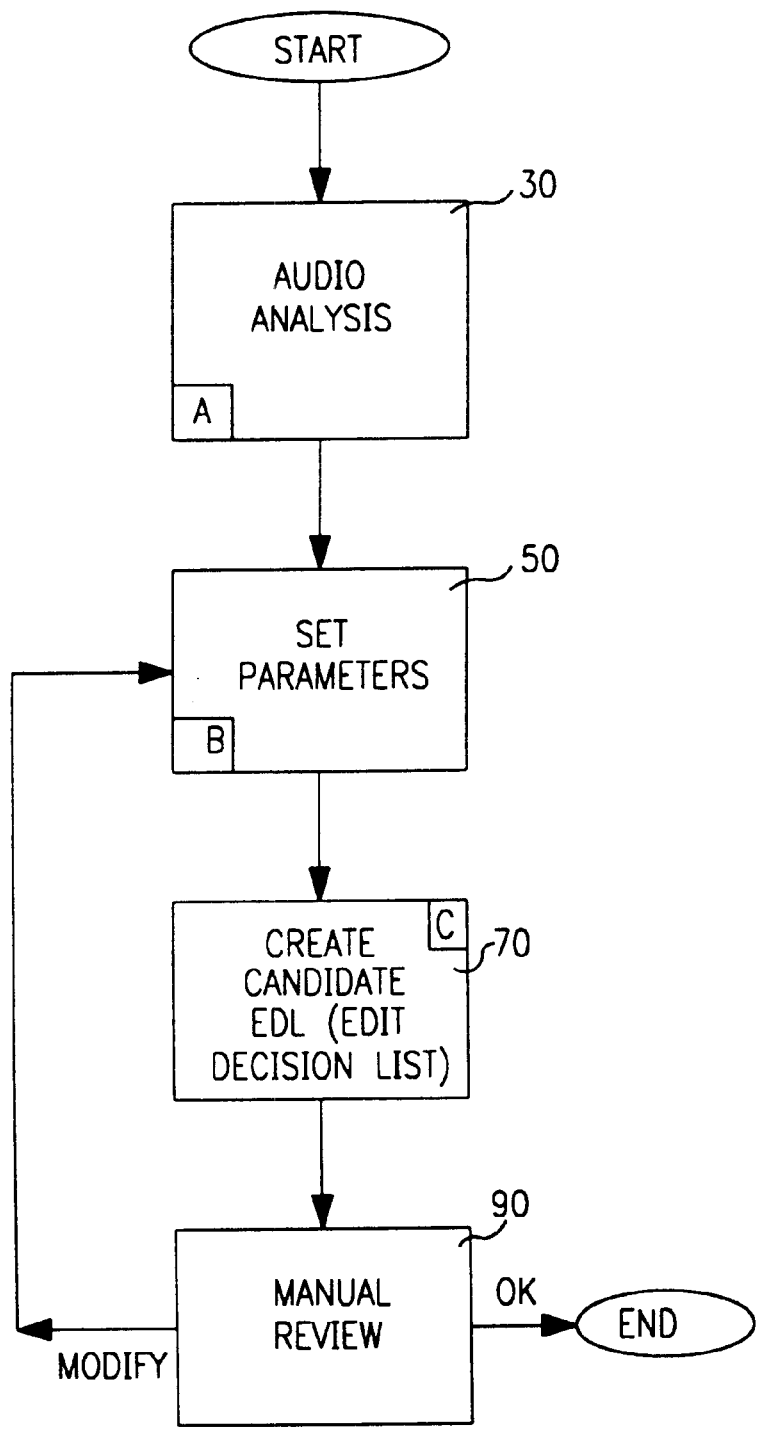
FIG. 3 is a flow diagram of a selection process for scenes of interest in the visual media of FIG. 2 using the system of FIG. 1A or B.

In FIG. 3, the entire audio track under investigation is first analyzed to determine the audio levels within a set of frequency ranges of interest in a step 30. An editor selects desired frequency ranges and analysis granularity. Analysis granularity refers to the length of intervals to be examined. For example, a granularity of one second means that each second of media will be analyzed separately. For some applications, the granularity of an analysis may be preset. Frequency ranges may be set to recognize things such as applause, the roar of crowds, the blowing of a whistle, etc. Certain of these ranges are representative of highlights in the event recorded in the tape. For each frequency, each time interval is analyzed and the audio level and time code recorded. When all frequencies have been analyzed for each time interval, the analysis is complete.

In a step 50, selection criteria are chosen, such as audio clip levels within frequency ranges. The parameters are selected for scenes of interest which correlate to the highlight(s) in an event. For each desired frequency range, several parameters are recorded. The audio level at which scenes are to be selected is chosen. Two time parameters, "P" and "F", are also chosen. "P" represents the number of seconds preceding the attainment of a threshold level which are to be included in a candidate clip for re-purposing. "F" represents the number of seconds following the attainment of the clip level which are to be included in the candidate clip. The candidate creation parameters are basic for the selection of the scenes of interest. Other selection criteria, such as total time desired for the aggregation of all candidate clips and more complex relations between the frequencies may also be chosen. Aggregation criteria may also be used, e.g. Exclusive OR, AND, and/or relations between the attainment of audio clip levels within different frequency ranges.

In a step 70, the selection criteria in step 50 are applied to the results of the analysis done in step 30 and result in a candidate Edit Decision List (EDL). In step 70, for each analysis interval and frequency range desired, the recorded audio level is compared with the parameters obtained from the step 50. The comparison generates candidate time codes for inclusion in the EDL. The list of time codes is then decomposed into a set of intervals representing the candidate clips. As shown in FIG. 7, each clip is represented by a "start" and "end" time code.

In a step 90, an editor can use the "start" and "end" time codes to navigate into an appropriate portion of the media and examine the candidate clip including the audio. The editor may choose to modify the parameters and generate alternate lists of candidate clips depending on the acceptability of the selection.

Other audio cues may be used to further refine the selection of the EDL. For example, if action is desired, the video may be analyzed for motion, and this analysis cross-referenced with the audio analysis. Another example would cross-reference fixed text word recognition with the analysis. In this case, recognition of words such as "touchdown" and "interception" within a given time range could be used to validate the appropriateness of candidate video clips. In such case, the EDL can reflect which key words have been observed with which clip.

Now turning to FIG. 4, the audio analysis of step 30 will be described in more detail.

Figure 4:
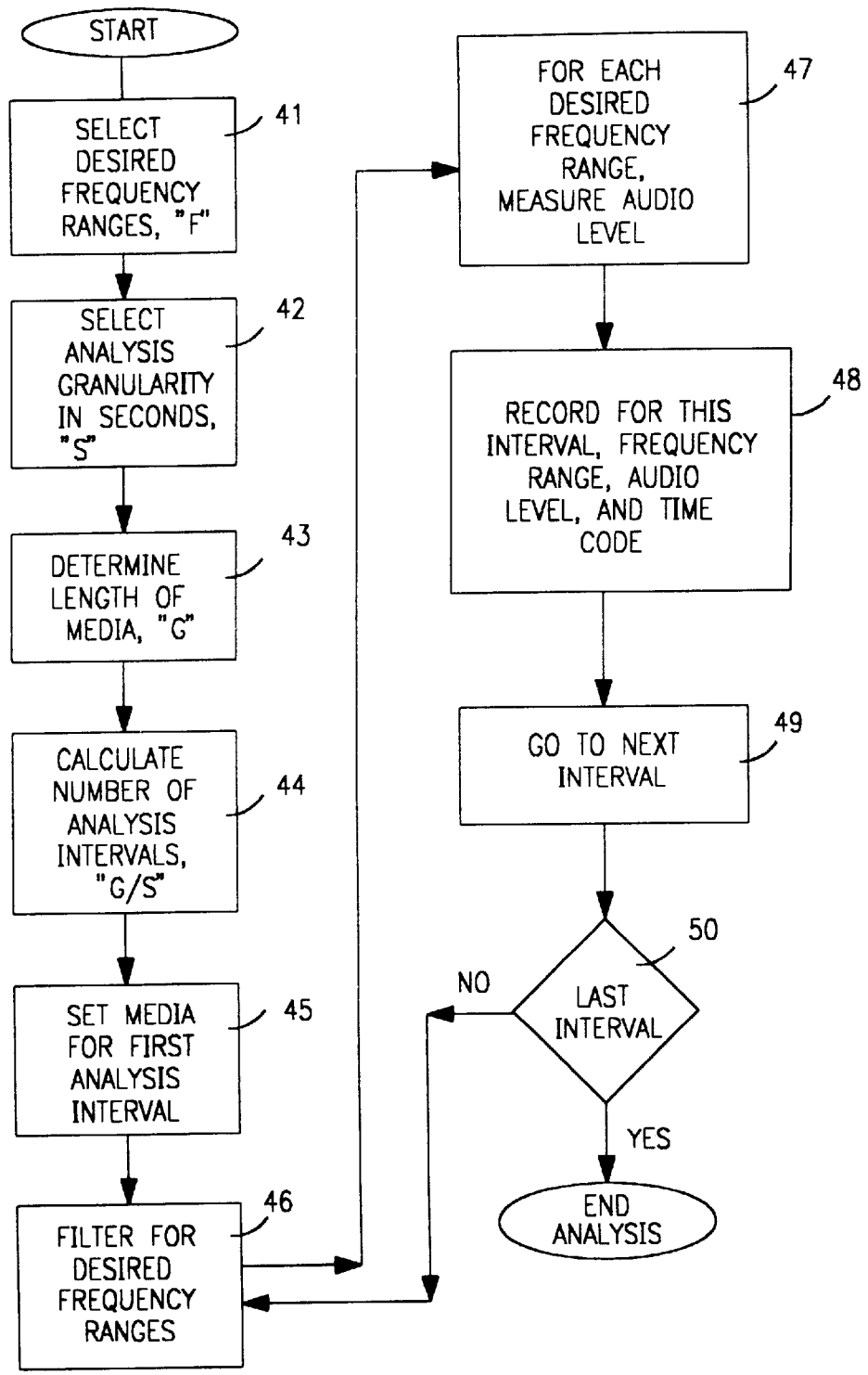
FIG. 4 is a flow diagram of an audio analysis conducted in the process of FIG. 3.

In FIG. 4, an audio analysis is started in a step 41 in which an editor selects desired frequency ranges (F) to identify scenes of interest in the soundtrack, such as applause, the roar of the crowd, blowing of a whistle, etc. Typically, these ranges are of the order of ten times the amplitude greater than the steady-state sound level. The duration of the sound of the interest can range from less than one second in the case of bullet shot or 10's of seconds in the case of the roar of the crowd responding to a sporting event.

In a step 42, an editor selects an analysis granularity or time-length of intervals in seconds (S) for examination. For example, a granularity of 1 second means that each second of media will be analyzed separately. With some applications, the granularity of analysis may be preset.

In step 43, determines the time length (G) of the event on the tape to be analyzed.

In step 44, the editor calculates the number of analysis intervals by the relation G/S. For each interval, the corresponding time code and audio level are recorded for each frequency.

In step 45, the media is moved to the time code for the first analysis interval.

In step 46, the soundtrack is filtered for desired frequency ranges using the system of FIG. 1A or B. For each frequency range the audio level is measured in a step 47.

The interval, frequency range, audio level and time code are recorded for subsequent use in step 48. The tape is moved to the time code for the next interval in a step 49 and the process is repeated until a test 50 indicates the last interval has been analyzed at which time the analysis ends.

Figure 5:
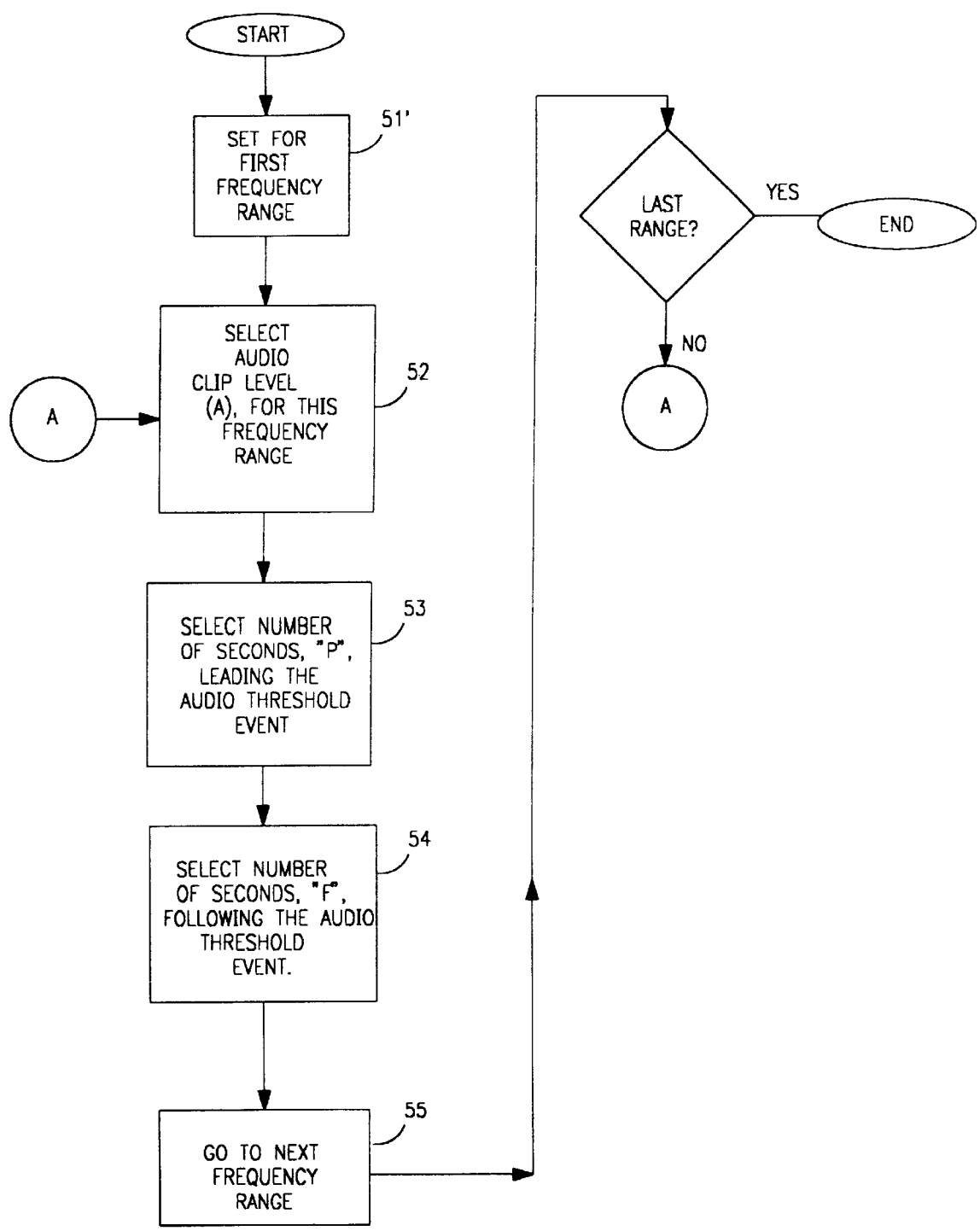
FIG. 5 is a flow diagram for setting audio parameters for selection of scenes of interest in the process of FIG. 3.

The process of setting parameters for the selection of scenes of interest by audio cues is described in more detail in FIG. 5. The process is started in a step 51 in which the editor selects a first frequency range for setting parameters to identify scenes of interest.

In step 52, the editor selects the audio clip level (A) at which scenes are to be selected for the first frequency range.

In step 53, the editor selects a time interval (P) in seconds leading the audio threshold event for the frequency range being investigated.

In step 54, the editor selects the a time interval (F) in seconds following the audio threshold event for the selected frequency range.

In step 55, the next frequency range is selected. In a test 56, the process returns to step 52 if the last frequency range has not had parameters assigned. The process for setting parameters for the selection of scenes of interest ends when the last frequency range has been classified.

Figure 6:
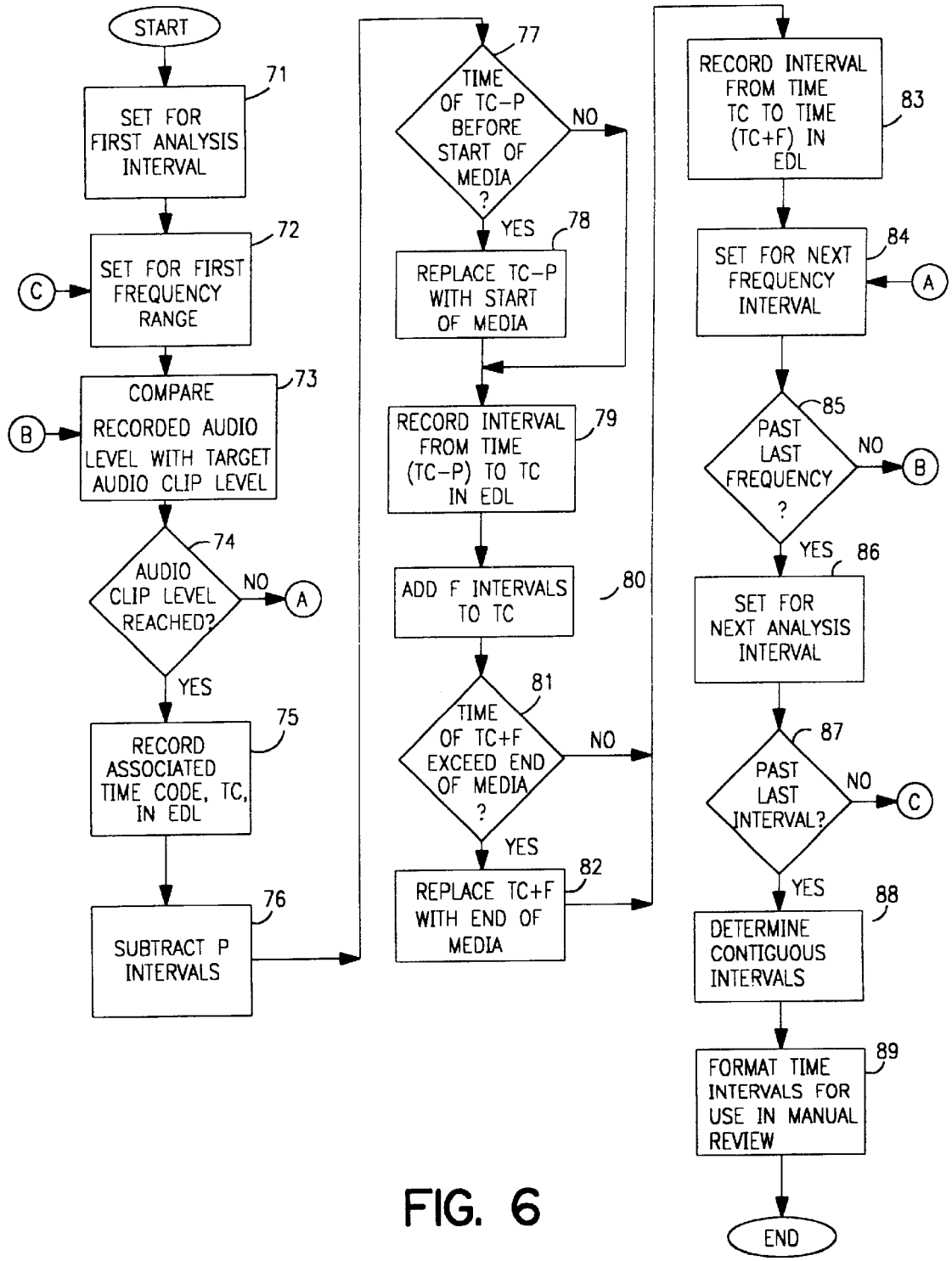
FIG. 6 is a flow diagram for creating an Edit Decision List (EDL) in the process of FIG. 3.

The process of creating candidate scenes for the EDL is further described in FIG. 6 in which a comparison is made of the recorded audio level with the parameters set in FIG. 4 to generate candidate time codes for inclusion in the EDL for each analysis interval and desired frequency range.

The process for creating the EDL is started in a step 71 in which the media is set for the first interval.

In step 72, the first frequency range of the first interval is provided to a comparator in a step 73 in which the recorded audio level is compared with the target audio clip level.

A test 74 is performed to determine whether the audio clip level has been reached. A "no" condition moves the program to entry point A which will be described hereinafter. A "yes" condition indicates that this interval contains an audio level in a frequency range which has exceeded the audio clip level or signal threshold and represents a scene of interest. The associated time code (TC) in the interval containing the scene of interest is recorded in the EDL in a step 75.

In step 76, the parameter P is subtracted from the first interval and a test 77 is performed to determine if the time of the time code minus P is less than the time code for the start of the media. A "yes" condition initiates a step 78 to replace the time code minus the parameter P for the analyzed interval with the time code for the start of the media, after which the program moves to step 79. Similarly, a "no" condition moves the program to step 79 in which the interval from time (TC–P) to the time code (TC) is entered in the EDL for the first analysis, after which, a step 80 adds the F interval to the time code recorded in the EDL for the frequency range analyzed in the first interval.

A test 81 is performed to determine if the time code for the event recorded in the EDL+the F parameter exceeds the time code for the end of the media. A "yes" condition initiates a step to replace the time code of the recorded event+the F parameter with the time code for the end of the media, after which the program moves to a step 83. Similarly, a "no" condition moves the program to the step 83 in which the interval time code+the F parameter is recorded in the EDL as a stop code for the event of interest.

In step 84 the program is set for the next frequency in the interval. Step 84 is also the entry point for node A in which frequencies which do not exceed the audio clip level are returned for analysis of the subsequent frequency range. A test 85 determines if the last frequency range has been completed for the interval. A "no" condition moves the program to entry point B which enters step 73 to compare the audio levels in the subsequent frequency range and determine "start" and "stop" time codes for scenes of interest as suggested by the subsequent frequency range.

Those intervals exceeding the audio clip levels are recorded in the EDL along with "start" and "stop" codes as described in conjunction with steps 77–84.

A "yes" condition for test 85 initiates a step 86 in which the tape is moved to the next interval for frequency analysis.

A test 87 determines whether or not the last interval has been analyzed. A "no" condition moves the program to entry point C which enters step 72 to set the first frequency range in the next interval, after which the process is continued for identifying scenes of interest in each frequency range and recording the selected scenes in the EDL with their "start" and "stop" codes per steps 77–83. The process is repeated until the last interval and the last frequency range thereof have been examined for scenes of interest. The scenes are recorded in the EDL for "start" and "stop" codes when appropriate. When the last interval has been analyzed, the test 87 indicates a "yes" condition which initiates a step 88 in which the editor determines the contiguous intervals which will be used in the re-purposing of the selected scenes. A step 89 formats the time intervals for use in manual review of the scenes by the editor after which the process ends.

FIG. 7 shows the EDL for the scenes of interest. Each scene is entered in the EDL with a highlight number, "start" time, and "end" time, which the editor can use to navigate the appropriate portion of the media and view the candidate clip. The editor may choose to modify the parameters and generate alternate lists of candidate clips depending on the acceptability of the suggestions. If the clips are accepted, they may be edited using industry standard audio and video editing techniques for their incorporation in new or modified products which maximizes the investment in the intellectual property assets represented by the video clips.

In summary, the present invention provides a system and method for automatically selecting scenes of interest as visual clips in a media, e.g., herein video, film, sound, etc., using audio cues and signal thresholds. The selected clips may be re-purposed in new, improved or modified products, thereby maximizing the investment return on the intellectual property asset represented by the clips. A method of selecting the scenes involves analyzing the audio track associated with the visual portion of the media for audio levels exceeding thresholds identified for the different frequencies and intervals of the media. These audio cues are used to identify visual clips incorporating scenes of interest. Each clip is associated with a "start" and "stop" code in which the audio cue has been detected as exceeding a threshold. The selected scenes are recorded in an Edit Decision List (EDL) which enables an editor to review the visual clips and re-purpose the clips into new or modified products.

While the invention has been described in conjunction with a specific embodiment, modifications can be made therein without departing from the spirit and scope of the invention as defined in the appended claims, in which:

We claim:

1. In a signal processing system including a multi media search and indexing system for automatic selection of scenes or sounds recorded in a media for replay in other contexts, a method for analyzing the media for a set of frequency ranges of interest for replay, comprising the steps of:
   (a) selecting desired frequency ranges of interest in the media as indicative of a scene or sound of interest;
   (b) selecting the granularity or length of the selected frequency ranges;
   (c) determining the number of analysis intervals on the media in the selected frequency ranges and granularity;
   (d) filtering the media for the desired frequency ranges;
   (e) measuring the audio level for the selected frequency ranges in each interval; and
   (f) recording the interval, frequency range, and audio level in the selected frequency ranges.

2. In a signal processing system including a multi media search and indexing system for automatic selection of scenes or sounds recorded in a media for replay in other contexts, a method for setting audio clip levels in analyzing the media for a set of frequency ranges of interest for replay, comprising the steps of:
   (a) selecting an audio clip level for each frequency range as indicative of a scene or sound of interest in the media;
   (b) selecting a time interval in seconds leading an audio level exceeding the clip level;
   (c) selecting a time interval in seconds following the exceeded audio clip level;
   (d) repeating steps (a), (b), and (c) for each frequency range; and
   (e) recording and relating each scene of interest exceeding the audio clip level to the index in the media in steps (a), (b), and (c).

3. The method of claim 1 further comprising the step of:
   (g) selecting the granularity of the analysis interval.

4. The method of claim 1 further comprising the step of:
   (j) setting the media for the first analysis interval.

5. The method of claim 1 further wherein the selection of the desired frequency ranges is the selection of one frequency range.

6. The method of claim 5 wherein the one frequency range is a human frequency range.

7. The method of claim 5 wherein the one frequency range is an entire audio spectrum.

8. The method of claim 5 wherein the one frequency range is the system capacity.

9. A program medium, executable on a computer system, for automatic selection of scenes or sounds recorded in a medium for replay in other contexts, comprising:
   (a) program code in a medium for selecting desired frequency ranges of interest in the media as indicative of a scene or sound of interest;
   (b) program code in a medium selecting the granularity or length of the selected frequency ranges;
   (c) program code in the medium determining the number of analysis intervals on the media in the selected frequency ranges and granularity;
   (d) program code filtering the media for the desired selected frequency ranges; and
   (e) program code in the medium measuring the audio level for the selected frequency ranges in each interval.

10. The program medium of claim 9 further comprising:
    (f) program code in the medium recording the interval, frequency range and audio level.

11. A signal processing system including multimedia search and indexing system for automatic selection of scenes or sounds recorded in a media for replay in other contexts, comprising:
    (a) means for selecting desired frequency ranges of interest in the media as indicative of a scene or sound of interest;
    (b) means for selecting the granularity or length of the selected frequency ranges;
    (c) means for determining the number of analysis intervals on the media in the selected frequency ranges and granularity;

(d) means for filtering the media for the desired frequency ranges;

(e) measuring the audio level for the selected frequency ranges in each interval; and (f) recording the interval, frequency range, and audio level in the selected frequency ranges.

12. The system of claim 11 further comprising:

(e) means for recording the interval, frequency range and audio level.

13. The system of claim 11 further comprising:

(f) means for selecting the granularity of the analysis interval, (g) means for setting the media for the first analysis interval.

14. The system of claim 11 further comprising:

(h) means for measuring the audio level for each desired frequency range in each interval.

15. The system of claim 11 further wherein the selection of the desired frequency ranges is the selection of one frequency range.

16. The system of claim 15 wherein the one frequency range is a human frequency range.

17. The system of claim 15 wherein the one frequency range is an entire audio spectrum.

18. The system of claim 15 wherein the one frequency range is the system capacity.

* * * * *